Nov. 1, 1949     I. A. WEAVER ET AL     2,486,896
BALANCE TESTING APPLIANCE Filed Sept. 21, 1945     6 Sheets-Sheet 1

INVENTORS.
Ira A. Weaver
Clyde H. Phelps
By Walter M. Fuller
Atty.

Nov. 1, 1949　　　　I. A. WEAVER ET AL　　　　2,486,896
BALANCE TESTING APPLIANCE
Filed Sept. 21, 1945　　　　　　　　　　　　6 Sheets-Sheet 4

Fig. 4.

INVENTORS
Ira A. Weaver
Clyde H. Phelps
By: Walter M. Fuller
Atty.

Patented Nov. 1, 1949

2,486,896

UNITED STATES PATENT OFFICE 2,486,896

BALANCE TESTING APPLIANCE

Ira A. Weaver and Clyde H. Phelps, Springfield, Ill., assignors, by mesne assignments, to Weaver Engineering Co., a corporation of Illinois Application September 21, 1945, Serial No. 617,772

14 Claims. (Cl. 73—66)

The present invention relates to certain features of betterment and advantage in balance-testing machines for rotors of various types whereby to determine the amount and location of the unbalance present preliminary to its elimination.

The invention has several objects among which may be mentioned the provision of a construction which functions effectively and efficiently and which may be actuated with ease and facility, accuracy and reliability of results being an important factor, as well as simplicity in structure and moderate cost of production.

To enable those skilled in this art to readily understand the invention and the advantages accruing from its employment, a present preferred embodiment thereof has been illustrated in detail in the accompanying drawings, forming a part of the specification, and to which reference should be had in connection with the following description, like reference numerals having been employed throughout the several views of the drawings to designate the same parts or elements.

Figure 1:
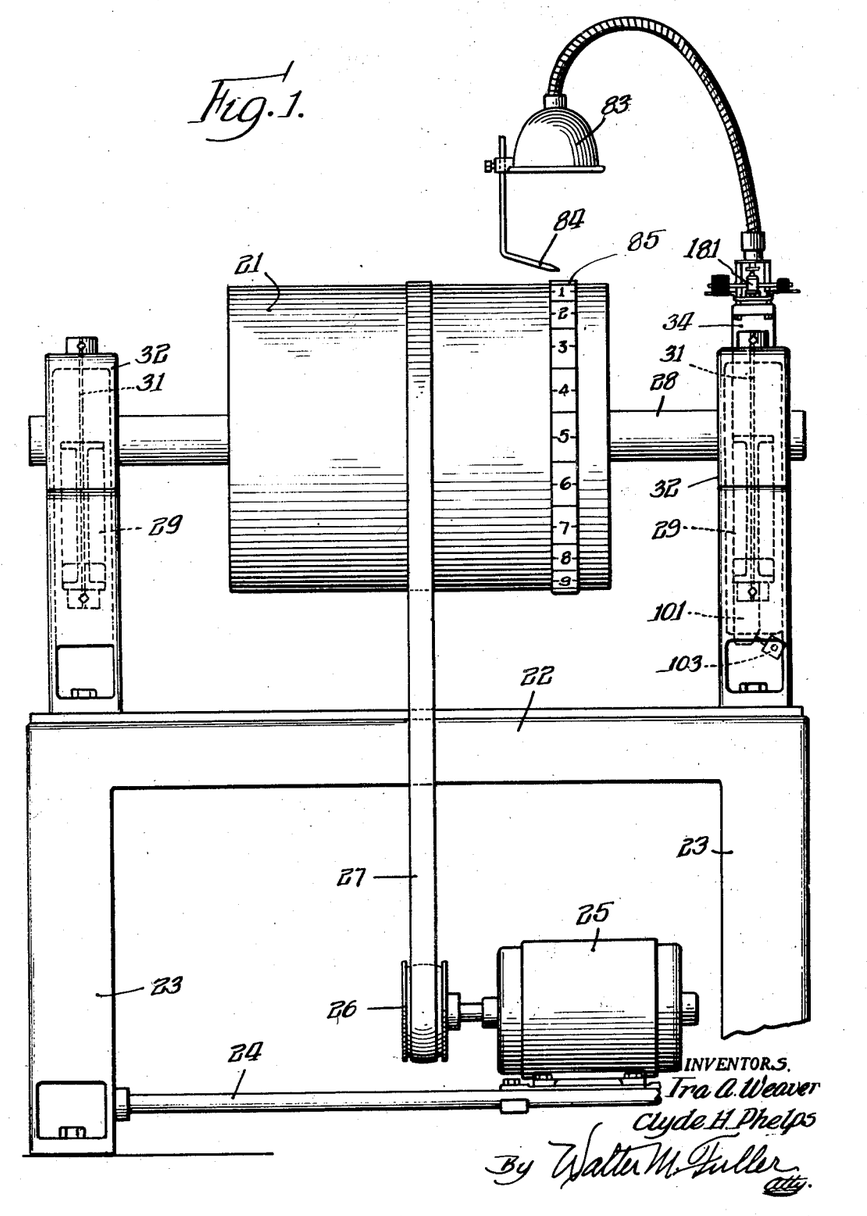
Figure 1 is a front elevation of the appliance.
Figure 2:
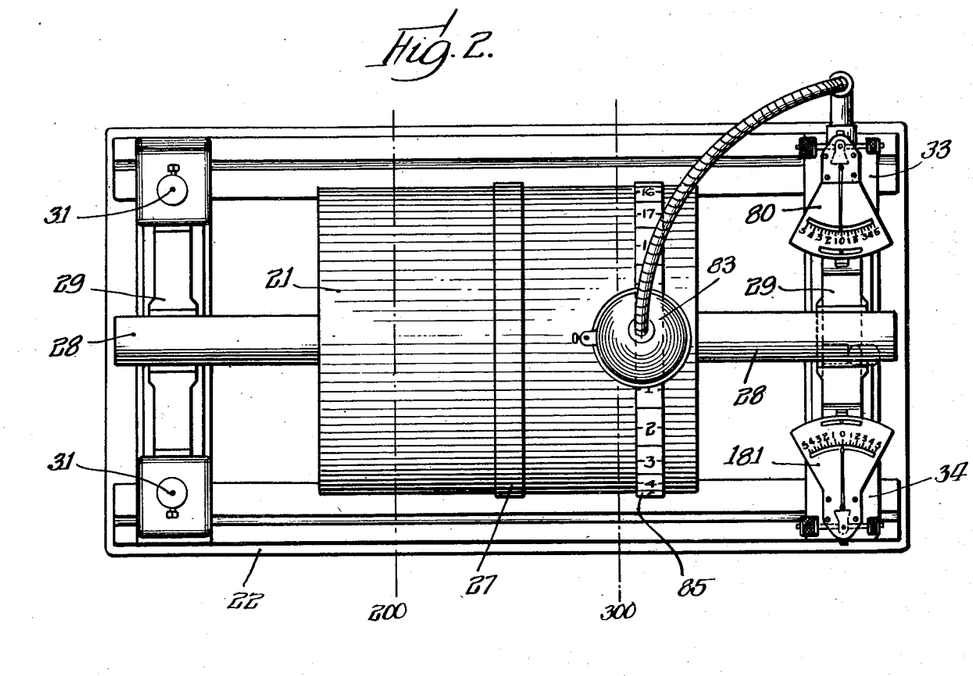
Figure 2 is a plan view of the same.
Figure 3:
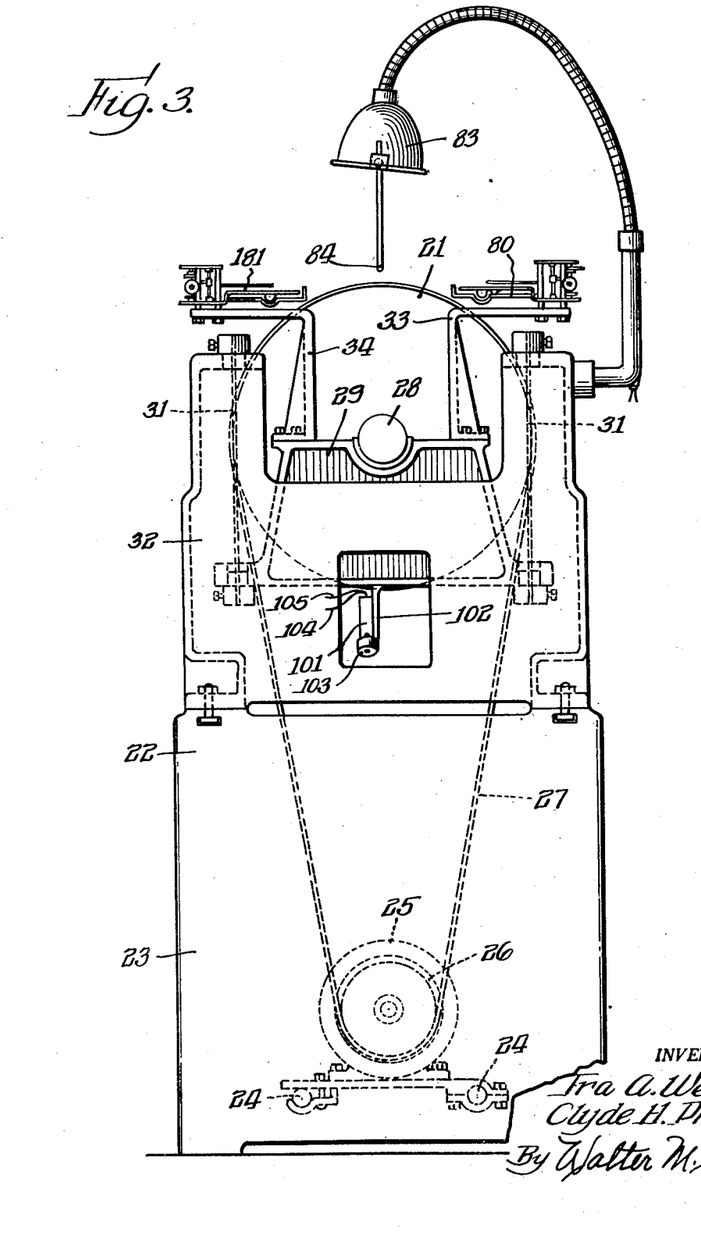
Figure 3 is an elevation of the right-hand end of the structure.

Referring to Figures 1, 2 and 3 of the drawings, it will be noted that the machine for supporting and revolving the rotor 21 to be tested as to its dynamic balance or lack thereof may comprise a stationary, horizontal frame 22 supported on end members 23, 23 connected together at their lower portions by a pair of parallel rods 24, 24 on which is mounted an electric-motor 25 whose pulley 26 rotates the rotor 21 by means of the belt 27 connecting therewith.

Such rotor 21 is mounted on and revolves with its shaft 28 whose end portions are rotatable in a pair of bearing-members 29, 29 each supported from above by two depending wires 31, 31 secured at their upper ends to supports 32, 32 upstanding from the terminal portions of frame 22, whereby these bearing-members and their shaft 28 and rotor 21 are free to vibrate or oscillate in their horizontal plane.

One of the pair of bearing-members 29, in the present case the right-hand one, is equipped with oppositely-facing twin standards or brackets 33, 34 (Figure 3) fixedly secured thereto and therefore movable or vibratory therewith in any horizontal direction.

On the flat, top, horizontal surface of each such bracket 33, 34 is firmly mounted a vibration-actuated balance-indicator (Figures 4, 5 and 6) including a frame comprising four, shouldered posts 35 screw-threaded at their lower ends at 36 which extend through complementary holes in the bracket and have securing nuts 37 on such ends, these posts conjointly carrying a flat top-plate 38 and a larger, lower, apertured bent plate 39.

The hub (Fig. 5), on which a gear-sector 42 is fixed has longitudinally spaced-apart, vertical pivots 43 and 44 pressed fixedly into the end portions of gear-hub aperture 45, the conical ends of such registered pivots being accommodated in bearings 46 and 47 mounted on plates 38 and 39.

An elongated, horizontal, screw-threaded rod 48 fits in, extends through, and is adjustable lengthwise in, a screw-threaded hole through the hub 41 between the adjacent ends of the two pivots 43, 44 (Figs. 4, 5 and 6), such rod on opposite sides of the hub carrying two inertia masses or weights 49 and 51 (Figs. 4 and 6) of different values threaded on, and therefore individually longitudinally adjustable on, the rod, the latter being held in place by a set-screw 52 engaging it in the gear-hub 41 (Figs. 5 and 6), each weight 49 and 51 having its own set-screw 53 (Figs. 4 and 6) for maintenance of its lengthwise adjustment on the rod.

The inner end of a coiled-spring 54 (Figs. 4 and 5) is secured to a member 55 mounted on the upper pivot 43 (Fig. 5), the outer end of such spring being adjustably connected to a member 56 depending from the friction-controlled part 57 (Figs. 4 and 5) adjustable angularly around the axis of bearing 46 to vary the tension of the spring.

Figures 5, 6:
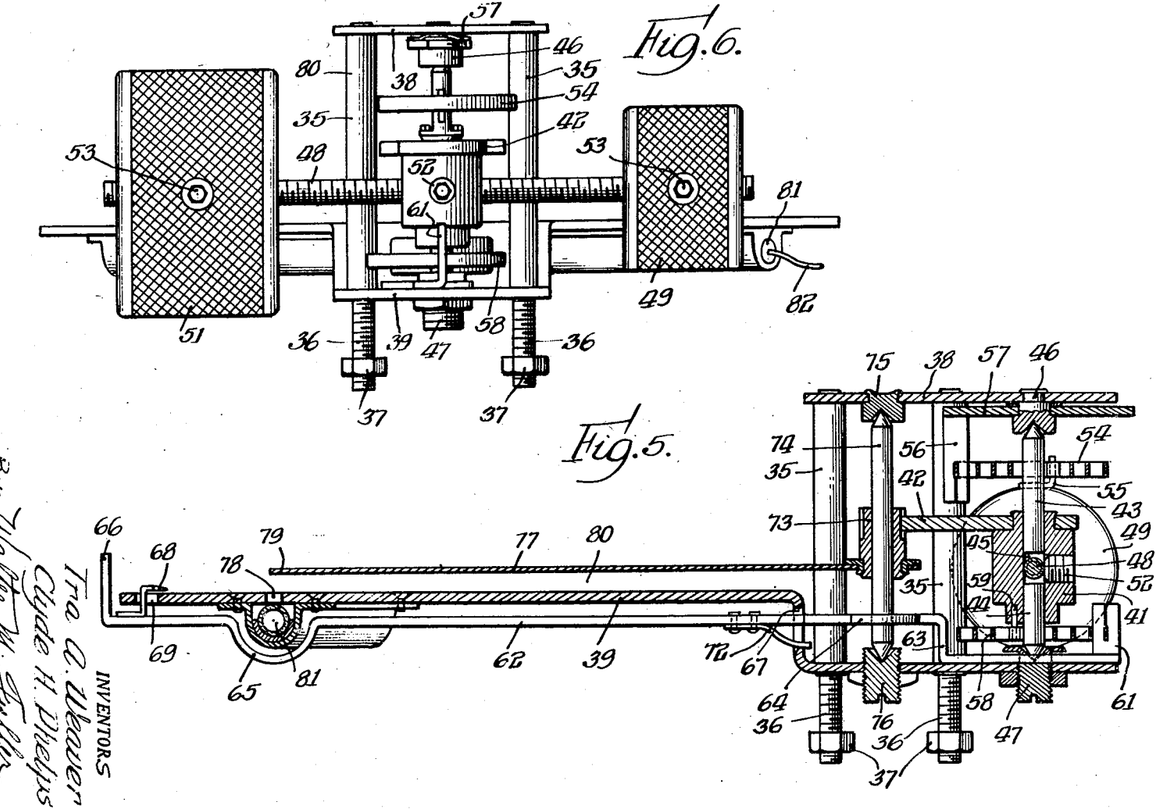
Figure 5 is a vertical section on line 5—5 of Figure 4.
Figure 6 is an end elevation of the indicator presented in Figure 4.

Analogously, the inner end of an oppositely coiled spring 58 is connected to the lower pivot 44 by a member 59, the outer end of the spring being joined to an upstanding arm 61 on one end of an elongated arm 62 oscillatory about the axis of bearing 47 and having several bends 63, 64, 65 and 66, such member 62 extending through an aperture 67 in element 39 (Figure 5).

Part 66 constitutes a handle by means of which an index 68, mounted on the member 62 and projecting up through an arcuate slot 69 through the plate 39, may be turned into register with the zero-graduation on a curved scale 71 (Figure 4) on the top of plate 39, the index 68 being normally maintained in adjusted zero position by a friction-spring 72 carried by the part 62 and bearing on and pressing against the bottom-wall of aperture 67 (Figure 5).

The teeth of gear-sector 42 mesh with those of a pinion 73 (Figs. 4 and 5) fixed on a shaft 74 having conical ends operating in conical bearings 75, 76, the hub of such pinion having a lengthy pointer 77 coacting at its end 79 with scale 71.

Figure 4:
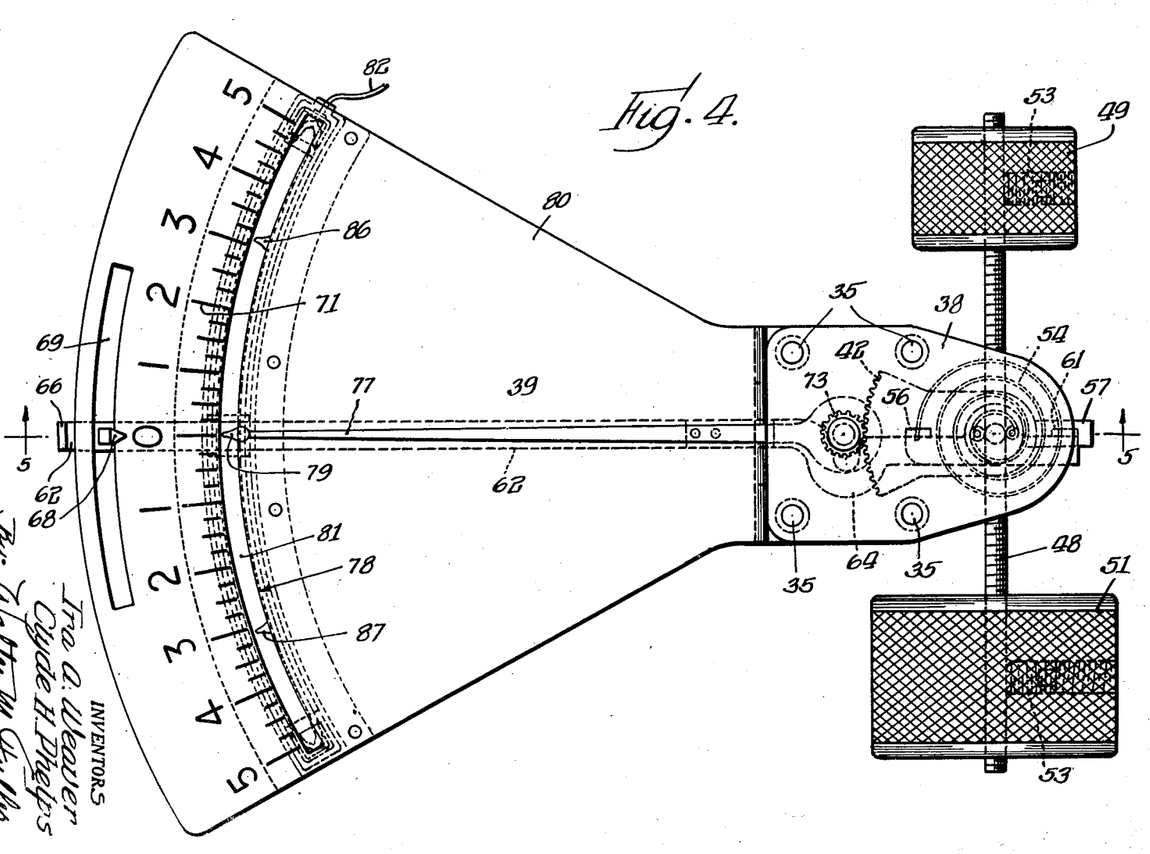
Figure 4 is a plan or face view of the unbalance indicator.

Thus by proper adjustment of the cooperating elements specified, the index 68 can be opposite the zero of the scale and the end 79 of pointer 77 can also register with the same zero, and the two oppositely coiled springs 54 and 58 will oppose with equal force the movement of the pointer in either of its opposite directions of rocking movement.

Whereas, the appliance so far described can be made to register the amount of unbalance in the revolving rotor, the preferred construction embodies other features and properties.

Accordingly, adjacent to scale 71, the plate 39 is provided with a slot 78 curved in conformity with the curvature of the scale which, of course, agrees with the path of travel of the end 79 of the pointer 77 which is just above the slot, and, directly beneath and in register with the slot 78, is a gas-filled or neon tube 81 (Figure 5) and its electric-terminal 82 (Figure 4).

In addition, as shown in Figures 1, 2 and 3, the appliance directly above the axis of rotor 21 is supplied with a stroboscopic-light 83 and its associated fixed pointer or index 84 and the rotor, just beneath the pointer, is fitted with a temporary, circular, peripheral, numerically graduated band 85 in the present case with twenty graduations.

This entire assembly designated as 80 in Figures 2, 3, 4, 5 and 6, as has been indicated, is mounted on one of the bearing-supports 29, as portrayed in Figures 1, 2 and 3, so that the relatively-small, vibratory motion about the axis of the aligned pivots 43 and 44 of the adjustable mass-system 48, 49, 51 is mechanically magnified by means of the gear-train 42, 73 to cause comparatively greater motion of pointer 77 in connection with the graduated scale 71, the spiral springs 54 and 58 normally holding pointer end 79 at zero.

With this complete assembly mounted as indicated on the balance-testing machine, vibration caused by unbalance in the revolving rotor oscillates the assembly and pointer 77, 79 will have amplified motion over scale 71 either side of zero, in phase with and proportional to unbalance in a selected transverse correction-plane of the rotor as indicated more fully hereinafter.

If a self-excited electric-pulse generator be used to flash the stroboscopic-light 83 (Figures 1, 2 and 3) and at the same time flash the gas-filled tube 81 (Figures 4 and 5) at a rate equal to the R. P. M. of the rotor, a numeral on number-band 85 will be apparently stationary opposite index-pointer 84 and the image of pointer-tip 79 may be viewed as stationary above the opening 78 over gas-tube 81 as the speed of flash R. P. M. and oscillation of pointer 79 are synchronized.

Figure 7:
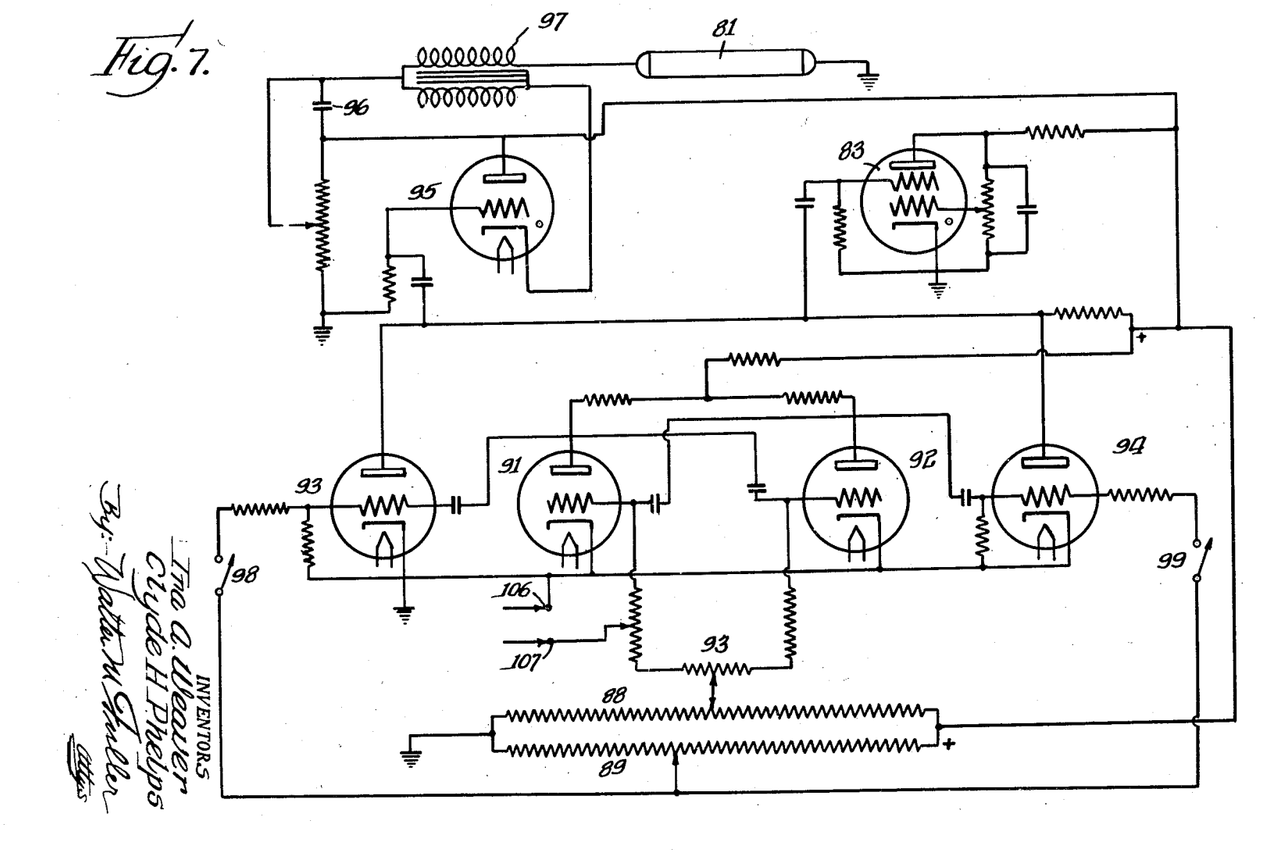
Figure 7 is a diagram of the electric circuits and the elements included therein.

If now the rate of flash be slightly increased or decreased by adjusting potentiometer 88 of Fig. 7, the number on band 85 and the pointer-end 79 will appear to have slow motion, the latter gradually moving back and forth while the number on band 85 appears to rotate moderately.

If the speed of flash be now changed by adjusting potentiometer 88 of Fig. 7 to a synchronous rate at a time when the pointer-image is at the end of its travel, the maximum amplitude of unbalance will be indicated on scale 71, and the stroboscopic-light 83 and its pointer 84 will indicate the unbalance position on number-band 85, and, as pointer 77—79 is oscillating in phase with the unbalance, it necessarily follows that when such pointer is at the end of its travel so also is the vibration amplitude of the rotor at its maximum displacement.

Therefore, if the pointer-image 79 is "stopped" at one end of its travel, the heavy unbalance point is at its maximum displacement point in the horizontal plane, and, if the pointer 79 is "stopped" at the opposite travel end, the heavy unbalance point is at its maximum displacement in the opposite direction.

Consequently, as the stroboscopic-light 83 and the gas-filled tube 81 flash simultaneously, the index located as shown will indicate the positions that the rotor must be in to correct for unbalance in the horizontal plane at a point such as the numeral "5" on number-band 85, while the graduation opposite the pointer-image of pointer 79 on scale 71 will indicate the value of unbalance.

A more precise method of use involves increasing the speed of flash to twice the R. P. M. of the rotor so that two pointer-images may be viewed at synchronism, then by slightly increasing or decreasing the flash-rate the pointer-images will travel away from and toward each other at the maximum position as shown in Fig. 4 where each image 86 and 87 of pointer 79 has reached its maximum travel to the right and to the left of zero which represent the total amplitude.

If now the flash-rate be adjusted until these two pointer-images 86 and 87 merge into one only, this will be at the center of amplitude or at zero on scale 71 at which time the heavy unbalance point of the rotor is in the vertical center longitudinal plane of the rotor, and, therefore, the speed of flash is now reduced to a single flash per revolution of the rotor and the unbalance point is indicated directly opposite the index 84 on the number-band 85. Either the light point or heavy point of the rotor may be indicated as the pointer 79 will travel in one direction when the heavy point is up and in the opposite direction when the light point is up.

At 86 and 87 there are shown the two pointer end images as they appear when "stopped" at both ends of the pointer travel, and, in this case, the examination shown at zero would not be feasible until the two images were merged into one at zero at the flash rate adjustment.

The foregoing operations were based on manually adjusting the pulse-generator by potentiometer 88 of Fig. 7 to vary the rate of light-flash for the stroboscopic-light 83 and the gas-filled tube 81.

Such electrical pulses need not be in any particular phase relation with the unbalance of the rotor so long as they occur at a rate equal to or double the R. P. M. of the rotor, as the pulse-generator may be phase-shifted by adjusting potentiometer 88 of Fig. 7 to cause the observation of a single pointer image at the zero point of scale 71 in the case of the double flash-rate, indicative of the center of vibration amplitude position and phase-shifted to cause two pointer-images at the widest separation indicative of the unbalance amplitude value.

In the case of a single-pulse per revolution, the pulse may be phase-shifted to a point where the single pointer-image is at its extreme travel position which is indicative of vibration-amplitude, and the position of unbalance may be observed on the number-band 85.

In every case, however, with any given value of unbalance the instantaneous position of the pointer 79 is the criterion of the vibration-amplitude and unbalance-position and, as the balance-testing machine is operated at a speed far above the natural frequency of its suspension-system, and as the inertia-operated mass-system of Figures 4, 5 and 6 is oscillating at a rate far above its natural frequency, the double amplitude of pointer 79 remains substantially constant for all operating speeds. Therefore, the indicating system is substantially independent of speed, both as to amplitude and position of unbalance, this being of the greatest importance as even the best motor-drive will have some speed-variation, whereas this system may be successfully and efficiently operated at varying speeds.

Bearing in mind that the indicating mechanism referred to hereinbefore will always oscillate at a frequency equal to the rotor R. P. M. and not at any other rate, we will now turn to the flash-providing means which, as indicated, may operate either at the speed of the rotor or at twice that speed, this construction being shown in Figure 7.

This known system which includes the gas-filled tube 81 and the stroboscopic-light 83 has a direct electric current source, not shown, such as batteries or a rectifier-system operating from A.-C. lines, the latter being used in practice and connected to the negative and positive terminals of the voltage divider 88 and 89.

Basically, the system consists of a self-excited oscillator 91 and 92 and is of the type known as a multi-vibrator which is capable of producing voltage pulses over a wide frequency range.

In such a circuit only one of the two tubes 91 and 92 are conducting at a time, the circuit constants determining whether one tube shall conduct for a longer time than the other, therefore, with symmetrical constants each tube conducts for 180 electrical degrees of each cycle, the potentiometer 88 of Fig. 7 controlling the frequency of a range of about ten to one.

The above two tube oscillator controls 93 and 94 which in turn trips or controls 95 and the stroboscopic-light 83. 95 discharges condenser 96 through spark-coil 97 flashing gas-tube 81.

With both switches 98 and 99 open, both the gas-tube 81 and the stroboscopic-light 83 will flash each time 91 and 92 are energized. If, however, one of the switches 98 or 99 is closed the corresponding tube 93 or 94 will be prevented from operation and, therefore, the gas-tube and the stroboscope-light will flash at one-half the oscillatory frequency.

If the potentiometer 88 of Figure 7 be adjusted to flash the stroboscope-lamp 83 at a rate synchronous with the vibration of the unbalanced rotor and the voltage developed by the crystal-generator 101, and mounted on one of the bearing members 29, or by other voltage-developing means, be applied to the input terminals 106 and 107 of the system portrayed in Figure 7, the oscillator will be held in step with the rotation of the rotor and then by the use of either one or both of the switches 98 or 99 one or two flashes per revolution may be obtained for the stroboscope-light and the gas-filled tube.

The adjustment of oscillator frequency need not be exact as the voltage developed by the crystal-generator 101 or other means will pull the oscillator into step with the rotation of the rotor after which phase adjustment may be made with the potentiometer 88.

The synchronizing voltage obtained from the crystal or other generator will keep the oscillator in step at either one or two flashes per revolution because of the self-running or self-excited feature of the oscillator and its symmetrical electrical constants, and, therefore, the speed of the rotor may vary but the oscillator will keep in step therewith.

There are other types of pulse-generators or as they are sometimes called "trigger-circuits" that operate on input signals or input voltage, such as from the crystal-generator and are responsive to both the positive and negative half-cycles, producing two pulses per cycle, such a trigger-circuit needing only the introduction of a rectifier to cause it to trip at one pulse per cycle, selecting either the positive or the negative half-cycle by switch means.

The circuit described and shown will function as required furnishing the desired single or multiple flash rate, either with or without the synchronizing potential from the crystal-generator.

Attention is directed to the fact that the present invention includes the important improvement which exists in the present balancing appliance, namely the feature of using the electrical impulse from some device, such as the crystal-generator 101, which is adapted to receive oscillation or vibration, but not rotation.

In the past many balance-testing machines have used some rotational device attached for rotation with the rotor undergoing test to obtain electrical contact closings or to generate a voltage of the same frequency as the rotor, such as shown in Figures 3, 4 and 5 of the United States Patent No. 2,349,530 wherein the cam actuates the contact points through rotation. The present device eliminates all rotational parts and in their place there has been provided the inertia-operated oscillation-driven device, in this case, the crystal-generator 101.

As illustrated most clearly in Figure 3, a piezo-electric crystal generator 101 referred to above is fixedly mounted on a vertically-depending portion 102 of the vibratory rotor-bearing member 29, such voltage-generator 101 and its mounting being offset to the left from the vertical plane through the axis of the rotor-shaft 28.

Such crystal-generator is of the known type used, for example, in phonograph-record pick-up work wherein the needle is demountably held in the generator and the vibrations of the needle by the record are transmitted to the crystal placing the latter under varying strains which produce the required changing voltages.

In this case, however, the needle has been replaced by a small rod carrying a weight 103, the developed voltages being available through the two terminal wires 104 and 105 associated with the crystals.

The value of the weight and the angle of mounting are not important or critical, one essential thing being to attach the generator to the vibrating part of the machine so that the weight will tend to remain stationary while the crystal will flex and generate a voltage which is, of course, of the same frequency as the R. P. M. of the rotor, this factor being the only essential requirement of the generator which might be aptly characterized as an impulse timing unit.

The off-center location of the generator is employed as there exists the remote possibility that the center-of-percussion point, or point of zero motion, might be in the bearing on the vertical center plane, whereas it is impossible for such a point to occur at either side of such plane.

It will be readily perceived that, if the center-of-percussion point of zero motion existed through the center of the generator, there would be no motion to cause the crystal to flex and, therefore, no voltage developed, but this cannot occur with the generator away from the center plane where it is impossible to encounter the percussion center.

The single weight employed is simply of any value of mass to cause the crystal to flex and generate any value of voltage for synchronizing purposes.

Preliminary to the testing of the unknown balance characteristics of rotors 21, a like rotor is first balanced by trial and error, after which a known unbalance weight is affixed thereto in the left-hand one of two initially-selected, transverse correction-planes 200 and 300 through such already balanced rotor which under those circumstances would be in the place of the rotor 21, illustrated in Figures 1 and 2, and, during the rotation of such now unbalanced, but previously balanced, rotor the two weights 49 and 51 of the mass system 80 on the right-hand bearing member 29 are adjusted longitudinally with respect to one another on their common rod 48 to eliminate all oscillation thereof about the axis of the two aligned pivots 43 and 44 resulting in zero indication on the associated scale 71 and, after this condition has been established, such mass-assembly of the appliance 80 will respond to unbalance present in all transverse planes through the rotor except that in the left-hand correction-plane 200.

When the meter gives a zero reading as set forth above, the inertia values of the two weights 49 and 51 are equal and there is, therefore, no tendency to move the pointer 77, 79, it being understood that when the meter indicates a value of unbalance, it is due to the fact that the two inertia forces of the two masses 49 and 51 are not the same and do not balance one another.

Then this unbalance weight may now be removed from the correction-plane 200 of the rotor and be applied to the rotor in the right-hand correction-plane 300 and the mass-assembly of the second indicating mechanism, characterized 181 in Figures 1, 2 and 3, is thereupon, during the rotation of the now unbalanced rotor, adjusted to zero response and this mass-assembly of the appliance 181 will now respond to unbalance in any transverse plane through the rotor except any in the right-hand correction-plane 300.

Now the mass-assembly of the indicating-mechanism 80 will respond proportionately to any unbalance attached in the right-hand correction-plane 300 and the mass-assembly of the indicator-mechanism 181 will respond proportionately to any unbalance weight attached to the rotor in the left-hand correction-plane 200, and, therefore, by the employment of known unbalance weights in the planes referred to, the scales 71 of both indicators may be calibrated in amounts of unbalance.

Thereafter, any number of similar or comparable rotors of unknown unbalance properties may be tested without further mass-system adjustment and the scales of the two appliances 181 and 80 will show the amounts of unbalance in the two planes 200 and 300, which information will render the balancing of the rotor a matter of ease and convenience, the angular position of application of added weight or reduced weight being shown by the cooperating stroboscopic-light and its graduated band 85 as hereinbefore set forth.

Those acquainted with this art will readily understand that this invention, as defined by the appended claims, is not necessarily limited and restricted to the precise and exact features of detail set forth, and that reasonable modifications may be resorted to without departure from the heart and essence of the invention and without the loss or sacrifice of any of its material benefits and advantages.

Whereas herein a pair of weights 49 and 51 of different values have been described as adjustable relative to one another on the pivoted threaded rod 48 common to both, it is to be understood that any equivalent mechanical structure may be substituted therefor, as for example two weights of equal value, or a mere single rod without any added weights thereon provided such rod is of proper weight and length and is adjustable lengthwise with relation to the pivot so that the weights of the portions of the rod on the opposite sides of the pivot are unequal in amounts to accomplish the stated results.

We claim:

1. In a balance-indicator, for use on a balance-testing machine in which the revolving rotor undergoing test vibrates horizontally by its unbalance, the novel combination of a mounting for attachment to said machine to be vibrated in consonance with the unbalance vibration of the rotor, a support having a vertical axis carried on said mounting, a pair of inertia-weights mounted on a horizontal rod on said support on opposite sides of its axis with manual adjustment toward and from one another on said rod and adapted to oscillate said support by the action of the rotor unbalance on the weights, means displaying a scale graduated in opposite directions from an intermediate zero-graduation, a movable pointer coacting with said scale, mechanical means to actuate said pointer by the oscillation of said support, and opposed yielding means to maintain said rod and its weights in neutral position parallel to the axis of the revolving rotor and with the pointer at zero-graduation of the scale when not subjected to rotor unbalance.

2. The balance-indicator set forth in claim 1, in which said inertia-weights are of different values.

3. The balance-indicator set forth in claim 1, including in addition an intermittently actuated light-flash means to illuminate said pointer automatically in synchronism with the unbalanced-rotor vibration.

4. The balance-indicator set forth in claim 1, including in addition a light-flash means to illuminate said pointer automatically, and manually controlled means to produce said flashes at different periodicities including one that is in synchronism with the unbalanced rotor vibration.

5. The balance-indicator set forth in claim 1, including in addition a light-flash means to illuminate said pointer, and means to produce a flash thereby automatically for each revolution of the rotor.

6. The balance-indicator set forth in claim 1, including in addition a light-flash means to illuminate said pointer, and means to produce a flash thereby automatically twice per revolution of the rotor.

7. The balance-indicator set forth in claim 1, including in addition a light-flash means to illuminate said pointer, and means to produce said flashes thereby automatically coincident with the locations of the movable pointer at one of its extreme positions.

8. The balance-indicator set forth in claim 1, including in addition a light-flash means to illuminate said pointer, and means to produce said flashes thereby automatically coincident with the locations of the pointer at both of its opposite extreme positions.

9. The balance-indicator set forth in claim 1, including in addition a light-flash means to illuminate said pointer, and means to produce said flashes thereby automatically coincident with the locations of the pointer at both of its extreme positions and manually adjustable to cause said flashes to occur automatically at the zero graduation positions of the pointer.

10. A balance-indicator, for use on a balance-testing machine in which the revolving rotor undergoing test is mounted for vibration horizontally by its unbalance and in which such rotor is provided with means displaying a rotary, circular graduated scale and with a stroboscopic-light and its cooperative index, said balance-indicator including the novel combination of a mounting for attachment to said machine to be vibrated in consonance with the unbalance vibration of the rotor, a support having a vertical axis carried on said mounting, a pair of inertia-weights mounted on a horizontal rod on said support on opposite sides of its vertical axis with manual adjustment toward and from one another on said rod and adapted to oscillate said support by the action of the rotor unbalance on the weights, means displaying a second scale on said mounting graduated in opposite directions from an intermediate zero-graduation, a movable pointer coacting with said second scale, mechanical means to actuate said pointer by the oscillation of said support, and opposed yieldable means to maintain said horizontal rod and its inertia-weights in neutral position parallel to the axis of the revolving rotor and with the pointer at zero graduation of the second scale when not subjected to rotor unbalance, a light-flash means to illuminate said pointer, and means to produce automatically simultaneous flashes of said light-flash means and of said stroboscopic-light.

11. The balance-indicator set forth in claim 1, including in addition a light-flash means to illuminate said pointer automatically and an electric current generator energized by the vibration of the unbalanced revolving rotor determining the timed intervals of said light-flashes.

12. The balance-indicator set forth in claim 10, including an electric-current generator energized by the vibration of the unbalanced revolving rotor determining the timed periods of the simultaneous flashes of said light-flash means.

13. The balance-indicator set forth in claim 1, including in addition a light-flash means to illuminate said pointer, means to produce said flashes automatically at timed intervals, and a non-rotary electric current generator energized by the vibration of the unbalanced revolving rotor determining the timed intervals of said light-flashes.

14. The balance-indicator set forth in claim 10, including a non-rotary electric current generator energized by the vibration of the unbalanced revolving rotor determining the timed intervals of the means to produce automatically the simultaneous flashes of said light-flash means and of said stroboscopic-light.

IRA A. WEAVER.
CLYDE H. PHELPS.

REFERENCES CITED

The following references are of record in the file of this patent:

UNITED STATES PATENTS

| Number | Name | Date |
|---|---|---|
| 1,797,269 | Lundgren | Mar. 24, 1931 |
| 2,302,670 | Buchanan | Nov. 24, 1942 |